United States Patent
Sita (10) Patent No.: US 8,225,063 B2
(45) Date of Patent: *Jul. 17, 2012

(54) SYNCHRONOUS DYNAMIC RANDOM ACCESS MEMORY INTERFACE AND METHOD

(75) Inventor: Richard K. Sita, Audubon, NJ (US)

(73) Assignee: ATI Technologies ULC, Thornhill, ON (CA)

( * ) Notice: Subject to any disclaimer, the term of this patent is extended or adjusted under 35 U.S.C. 154(b) by 34 days.

This patent is subject to a terminal disclaimer.

(21) Appl. No.: 12/457,336

(22) Filed: Jun. 8, 2009

(65) Prior Publication Data

US 2009/0254699 A1     Oct. 8, 2009

Related U.S. Application Data

(63) Continuation of application No. 10/744,786, filed on Dec. 24, 2003, now Pat. No. 7,558,933.

(51) Int. Cl.
    *G06F 12/00*     (2006.01)
    *G06F 1/04*     (2006.01)

(52) U.S. Cl. ..... 711/167; 711/1; 711/105; 711/E12.001; 711/E12.053; 710/35; 713/600; 365/233.11; 365/233.18

(58) Field of Classification Search ................ None
See application file for complete search history.

(56) References Cited

U.S. PATENT DOCUMENTS

| | | |
|---|---|---|
| 5,560,000 A | 9/1996 | Vogley |
| 5,749,086 A | 5/1998 | Ryan |
| 5,805,504 A | 9/1998 | Fujita |
| 5,960,468 A | 9/1999 | Paluch |
| 6,205,046 B1 | 3/2001 | Maesako |
| 6,209,071 B1 | 3/2001 | Barth et al. |
| 6,343,040 B2 | 1/2002 | Bae |
| 6,370,630 B1 | 4/2002 | Mizuyabu et al. |
| 6,614,713 B2 | 9/2003 | Tanizaki et al. |
| 6,886,072 B2 | 4/2005 | Saruwatari et al. |

(Continued)

FOREIGN PATENT DOCUMENTS

JP     2001 282611     10/2001

OTHER PUBLICATIONS

Double Data Rate (DDR) SDRAM, Micron Technologies, Inc., 2003.

(Continued)

*Primary Examiner* — Michael Krofcheck (57) ABSTRACT

A memory interface allows access to SDRAM by receiving a column address for a data read or write of a burst of data units. Each data unit in the burst has an expected bit size. The interface generates n (n>1) column memory addresses from the received column address. The interface accesses the synchronous dynamic memory to read or write n bursts of data at the n column memory addresses. Preferably, the SDRAM is clocked at n times the rate of the interconnected memory accessing device, and the memory units. The data units in the n bursts preferably have one $n^{th}$ the expected bit size. In this way, SDRAM may be accessed with high memory bandwidth, without requiring an increase in the size of data units in the SDRAM, and the associated data bus. Conveniently, the interface may be operable in two separate modes or configurations. In one mode, SDRAM may be accessed through the interface in a conventional manner. In the second mode, SDRAM is accessed in multiple bursts for each received burst access. The interface may form part of a memory accessing device, or may be a separate component for use with such a device.

11 Claims, 6 Drawing Sheets

U.S. PATENT DOCUMENTS

| | | |
|---|---|---|
| 6,965,980 B2 | 11/2005 | Champion |
| 6,981,088 B2 * | 12/2005 | Holm et al. .................. 710/306 |
| 7,225,303 B2 | 5/2007 | Choi |
| 2003/0074517 A1 * | 4/2003 | Nicolai ........................ 711/167 |

OTHER PUBLICATIONS

DDR SDRAM/SGRAM Note, Samsung Electronics, n.d., MPP-JLEE-Q4-98, 1998.

* cited by examiner

SYNCHRONOUS DYNAMIC RANDOM ACCESS MEMORY INTERFACE AND METHOD

CROSS REFERENCE TO RELATED APPLICATIONS

This application is a continuation of co-pending U.S. patent application Ser. No. 10/744,786 filed Dec. 24, 2003, entitled "SYNCHRONOUS DYNAMIC RANDOM ACCESS MEMORY INTERFACE AND METHOD", the contents of which are hereby incorporated herein by reference.

FIELD OF THE INVENTION

The present invention relates generally to computer memory and more particularly to an adapter and method for allowing interconnection of a memory access device to synchronous dynamic random access memory (SDRAM) in at least two configurations.

BACKGROUND OF THE INVENTION

Modern computing applications and components have created a need for faster access memory. Recently, SDRAM has gained popularity. Unlike older asynchronous memory systems, data transfers from and to SDRAM are at a clocked rate. As the timing of SDRAM is very predicable, data can be transferred at a much higher rate than was possible with asynchronous random access memory designs. SDRAM and SDRAM access are, for example, detailed in Micron, MT46V32M4, MT46V16M8, and MT46V8M16 data sheets, the contents of which are hereby incorporated by reference.

At present, however, SDRAM is still quite costly. As a result, there is frequently a need in dedicated high performance memory systems to trade-off memory bandwidth (i.e. bits transferred per second) and storage capacity, for cost.

Typically, higher memory bandwidth may be achieved by transferring data in data units having increased bit sizes or at a higher rate.

So, for example, data transfer in data units of thirty-two bits can reach twice the memory bandwidth of data transfer in data units of sixteen bits. This, however, requires SDRAM modules having a larger data bus or multiple SDRAM modules interconnected to span accessed memory. Such re-configuration of memory to provide data units of increased bit size is often complex and requires chip and software re-design. Moreover, not all applications require the data unit bit size, that provides the memory bandwidth Similarly, memory may be accessed at higher speeds. Indeed, memory system design has witnessed a steady increase in bus speeds. In fact, modern SDRAM manufacturing and design techniques are producing SDRAM modules having a high density and manufactured to tight tolerances, that often allow memory access in excess of conventional memory bus speeds. However, memory accessing devices such as central processing units (CPUs), graphics processors, video processors, direct memory access (DMA) controllers and the like are typically designed to operate at the more conservative, conventional memory bus speeds, and therefore do not access the SDRAM at these higher rates.

Accordingly, there is a need for a simple interface that allows interconnection of a memory access device to SDRAM that provides flexibility in how interconnected random access memory may be configured, and the bandwidth with which the memory may be accessed.

SUMMARY OF THE INVENTION

In accordance, with the present invention, a memory interface allows access to SDRAM by receiving a column address for a data read or write of a burst of data units. Each data unit in the burst has an expected bit size. The interface generates n (n>1) column memory addresses from the received column address. The interface accesses the synchronous dynamic memory to read or write n bursts of data at the n column memory addresses. Preferably, the SDRAM is clocked at n times the rate of the interconnected memory accessing device, and the memory units. The data units in the n bursts preferably have one $n^{th}$ the expected bit size. In this way, SDRAM may be accessed with high memory bandwidth, without requiring an increase in the size of data units in the SDRAM, and the associated data bus.

Conveniently, the interface may be operable in two separate modes or configurations. In one mode, SDRAM may be accessed in a conventional manner. In the second mode, it is accessed in multiple bursts for each received burst access.

The interface may form part of a memory accessing device, or may be a separate component for use with such a device.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
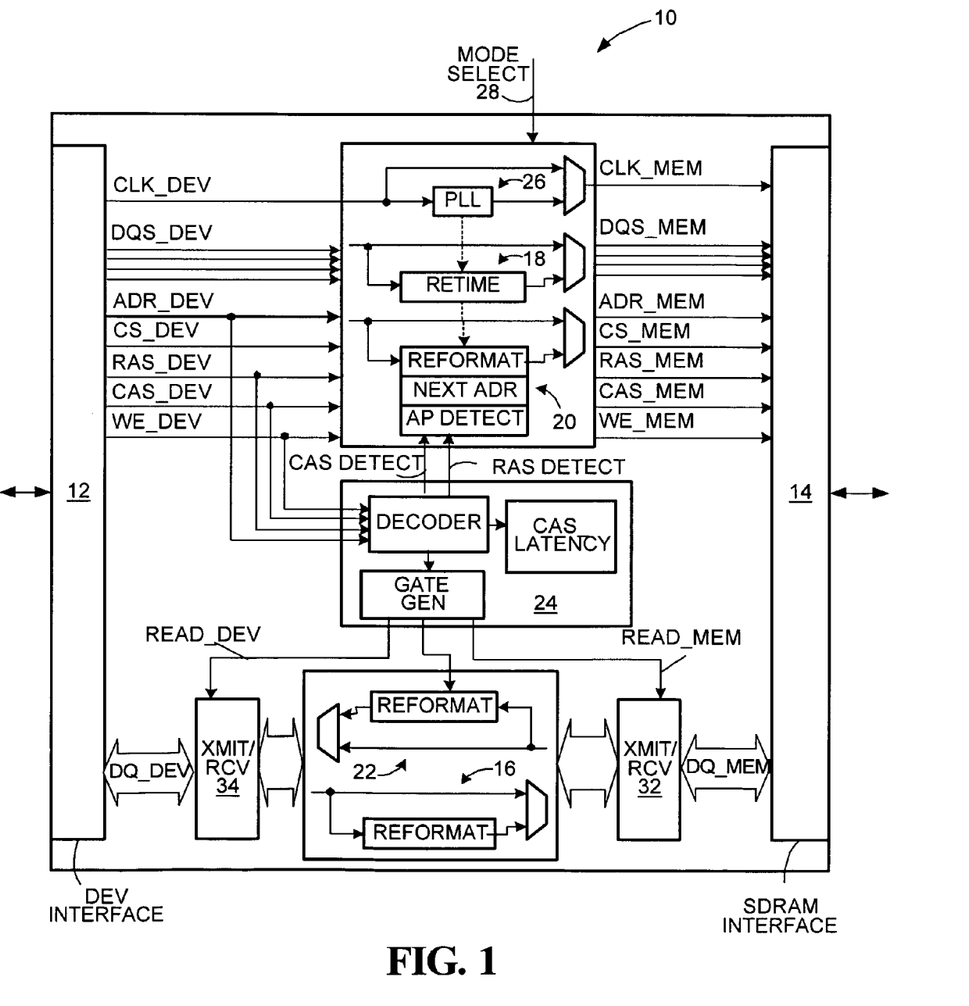
FIG. 1 is a schematic block diagram of a SDRAM adapter, exemplary of an embodiment of the present invention.

FIG. 1 is a schematic block diagram of an SDRAM memory adapter 10, exemplary of an embodiment of the present invention. As illustrated, adapter 10 has a device interconnect interface 12 and a memory interconnect interface 14. Each interface 12, 14 is compatible with signals presented to conventional dual data rate (DDR) SDRAM chips or modules. As will become apparent, adapter 10 may be interposed between a memory accessing device such as a CPU, DMA controller, or the like, and one or more standard SDRAM modules.

Device interface 12 has device interconnect lines: write data lines DQ_DEV; write data strobes DQS_DEV; row address strobe RAS_DEV; column address strobe CAS_DEV; write enable WE_DEV; device address lines ADR_DEV; chip select CS_DEV.

SDRAM interconnect interface 14 has SDRAM memory interconnect lines: write data lines DQ_MEM; write data strobes DQS_MEM; row address strobe RAS_MEM; column address strobe CAS_MEM; address lines ADR_MEM; chip select CS_MEM; and write enable WE_MEM.

As further illustrated, device and memory data lines DQ_DEV and DQ_MEM for write accesses are interconnected by reformat block 16. Write data strobes (DQS_DEV and DQS_MEM) by reformat block 18; row address strobes, column address strobes, write enables, address lines and chip selects (CAS_DEV, ADR_DEV, WE_DEV, CS_DEV and CAS_MEM, ADR_MEM, WE_MEM, CS_MEM) by address generator/converter 20. Memory data lines (DQ_DEV and DQ_MEM) for read operations are interconnected by reformat block 22. Decoder/timing block 24 further provides adapter internal RAS_DETECT and CAS_DETECT, READ_DEV and READ_MEM signals, as detailed below.

Typically, an SDRAM module provides data from memory units and receives data to memory units by way of the same data lines. Communicating interfaces of interconnected memory accessing devices therefore typically include a two or three state receiver/transmitter interconnected to these data lines. Adapter 10 likewise includes two data transmit/receive blocks 32 and 34. Block 32 determines whether data is written to or read from DQS_MEM data lines of interconnected SDRAM by way of reformat block 16 or 22. Similarly, block 34 determines whether data is written to or read from DQS_DEV data lines of interconnected device. The data transmit/receive blocks 32 and 34 each take as inputs two separate sets of data lines, one set from reformat block 22 for reading to memory, the other set from reformat block 16 for writing to memory. Which of these sets is interconnected to DQS_MEM of interconnected SDRAM is determined by the state of block 32. Which of the sets is interconnected to DQS_DEV of an interconnected device is determined by the state of block 34. The states of blocks 32 and 34 are toggled by interconnected timing block 24. In the disclosed embodiment, blocks 32 and 34 are two state transmit/receive blocks. Absent a signal (READ_MEM, READ_DEV) from timing block 24, transmit/receive blocks 32 and 34 are in their transmit mode. Transmit/receive blocks 32 and 34 could, of course, be formed as a tri-state transmit/receive blocks.

Decoder of timing/decoder block 24 decodes various SDRAM access commands sent from an interconnected device to interconnected SDRAM. The decoder is more particularly illustrated in FIG. 2. As illustrated, the decoder of block 24 takes as inputs CAS_DEV; RAS_DEV; ADR_DEV and WE_DEV arriving from a device at interface 12. Block 24 decodes column addressing commands; row addressing commands; and register programming commands that program the CAS latency of an interconnected SDRAM module. In response decoder block 24 generates RAS_DETECT and CAS_DETECT signals corresponding to row and column address commands, respectively. Similarly, programming of registers to program CAS latency of an interconnected SDRAM is detected using CAS_DEV; RAS_DEV; WE_DEV and bits BA0 and stored in CAS_LATENCY store of block 24. As will become apparent, knowledge and storage of the CAS_LATENCY is used to change the state of blocks 32 and 34 to arbitrate read and write access to interconnected SDRAM.

Figure 2:
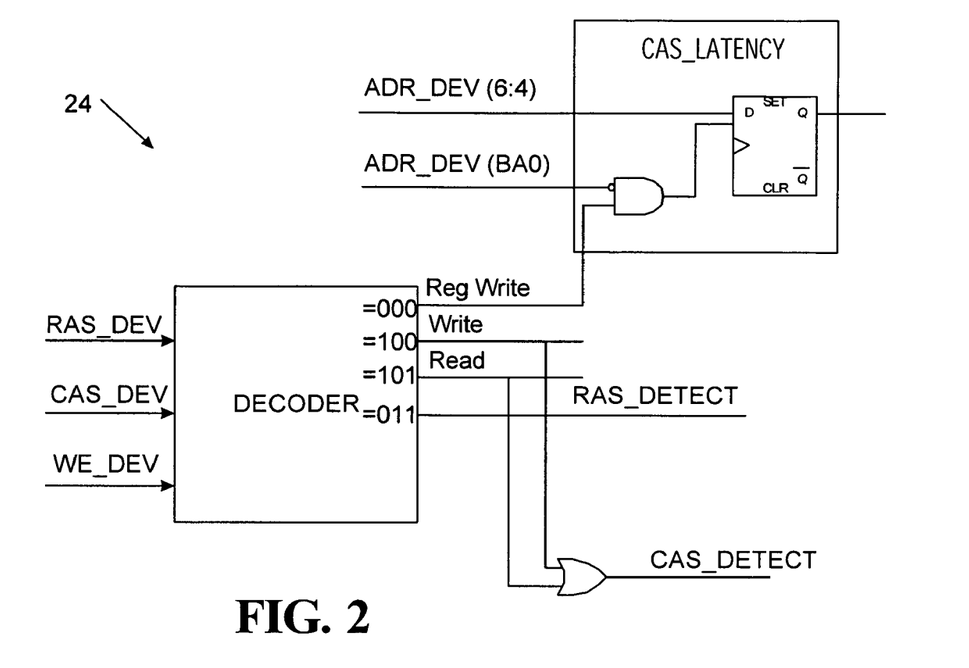
FIGS. 2-4 are schematic block diagrams of portions of the SDRAM adapter of FIG. 1.

Gate generation block of timing/decoder block 24 generates read commands to be provided to device transmit/receive block 34 and to SDRAM transmit/receive block 32 upon decoding a read operation, as detailed below.

Device and memory clocks (CLK_DEV and CLK_MEM) are interconnected by synchronization block 26. Block 26 includes a conventional phase lock loop (PLL) that may derive the memory clock as a multiple of the device clock. As will become apparent, in one mode of operation block 26 generates a memory clock CLK_MEM=2×CLK_DEV.

Figure 4:
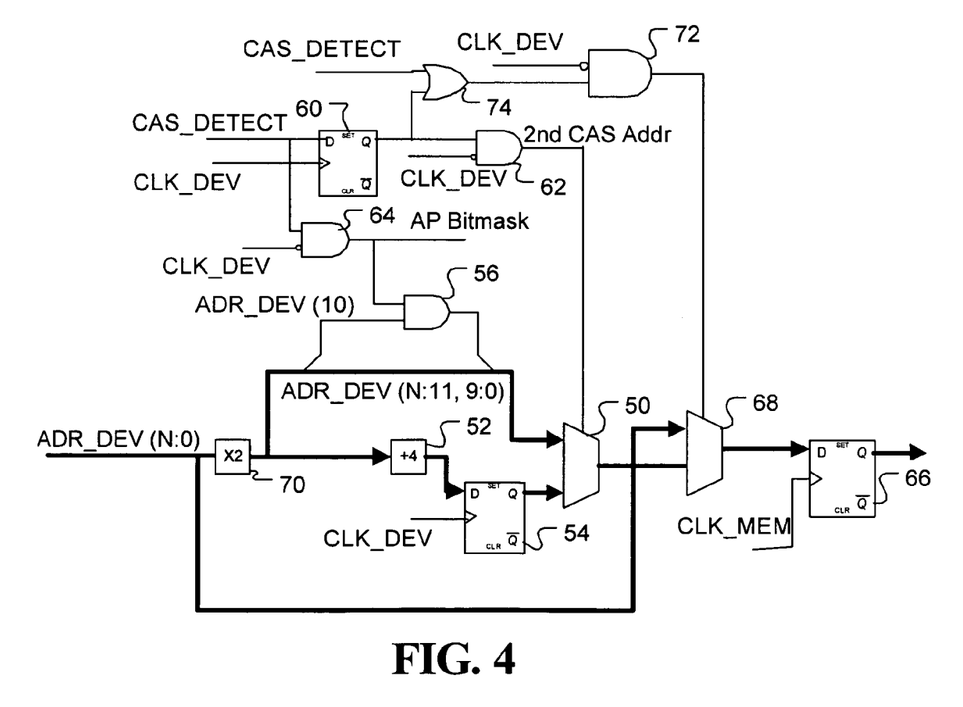

An exemplary structure of address generator 20 is illustrated in FIG. 4, and is further detailed below. As will become apparent, in one mode of operation address generator 20 generates multiple (i.e. n) column memory addresses from a received column address. It generates received row address between two generated column addresses.

Blocks 16, 18, 22, 24, 26, 32, 34 and address generator 20 may be formed using conventional combinational and sequential logic in manners understood by those of ordinary skill, to translate SDRAM access instructions and data as detailed below.

Figure 5:
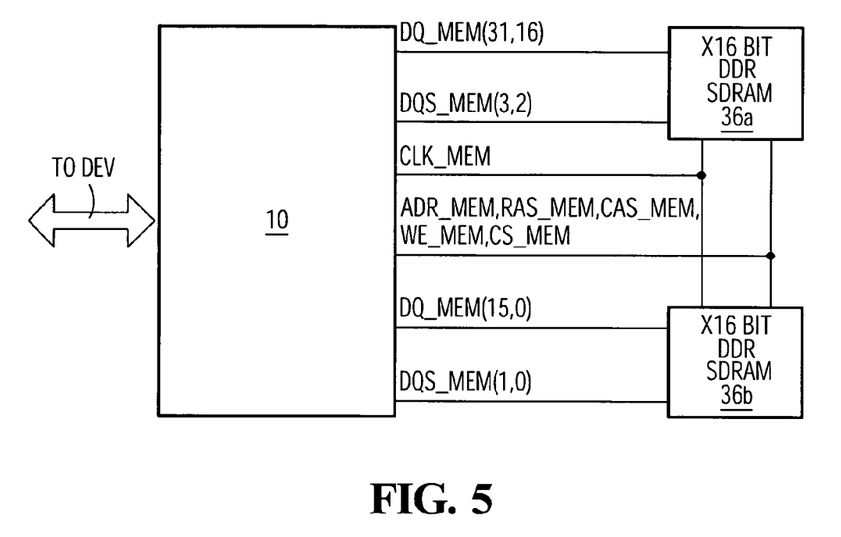
FIG. 5 is a block diagram illustrating interconnection of the memory adapter of FIG. 1 in a first configuration.

In the illustrated embodiment, adapter 10 allows interconnection of a standard thirty bit SDRAM memory interface having thirty two data lines, in one of two configurations. In its first configuration, the SDRAM adapter 10 may be interconnected to two sixteen bit SDRAM modules 36a and 36b as illustrated in FIG. 5. Each SDRAM module 36a, 36b provides one half of the bits (sixteen bits each) of each data unit for each memory read or write with the sixteen most significant lines interconnected with module 36a and the sixteen least significant bits 36b. As a result, data is read and written from and to interconnected memory by an interconnected device in 2×16=32 bit words, per operation. This configuration of interconnection allows access to interconnected memory in the identical manner as the memory would be interconnected and accessed by the device without adapter 10.

Figure 6:
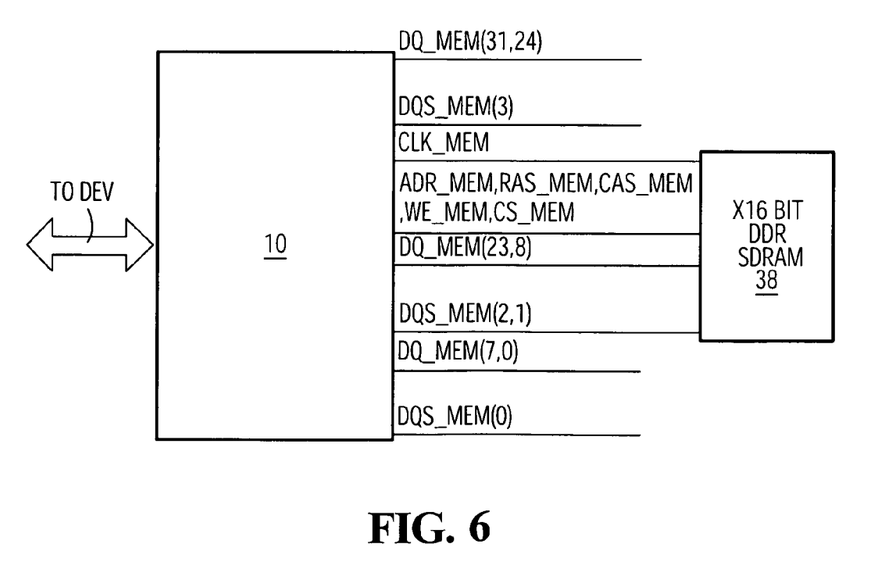
FIG. 6 is a block diagram illustrating interconnection of the memory adapter of FIG. 1 in a second configuration.

In a second configuration, adapter 10 allows interconnection of a thirty-two bit device interface to a single, sixteen bit SDRAM module 38 as illustrated in FIG. 6. Data lines 8-23 are interconnected to sixteen data lines of SDRAM module 36. In this mode of interconnection, a single SDRAM module 38 may be accessed at the same rate, or double the clock rate of two SDRAM modules. If accessed at the same rate as two SDRAM modules, the overall throughput from interconnected SDRAM module 38 is one half that illustrated in FIG. 2. If accessed at double the rate, the overall throughput from or to interconnected SDRAM module 38 is the same as illustrated in FIG. 6.

The configuration/mode of operation may be selected by an external signal at mode select input 28.

Figure 7:
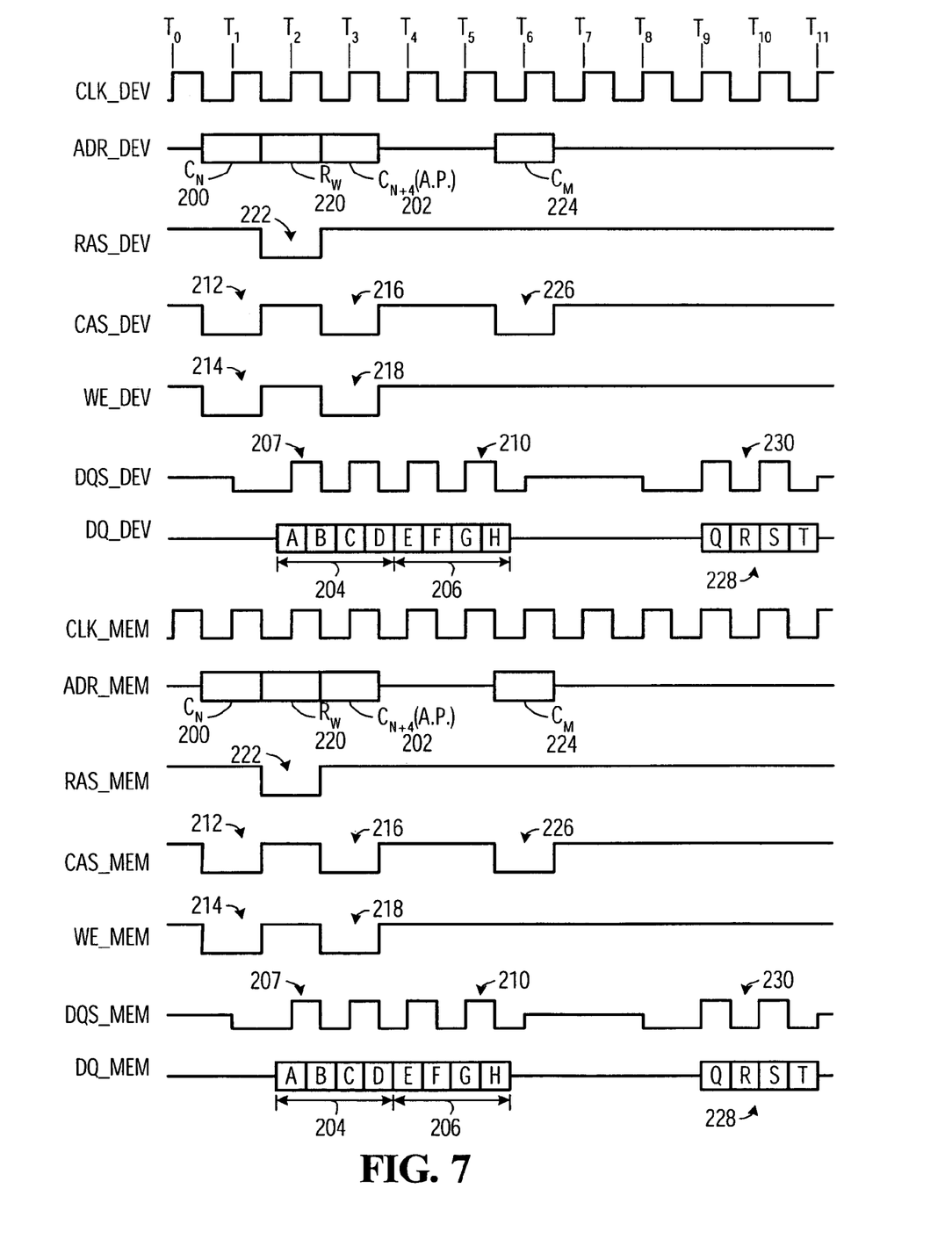
FIG. 7 is a timing diagram of the memory adapter of FIG. 1 in the configuration of FIG. 5, in operation.

In order to appreciate the operation of adapter 10, FIG. 7 illustrates a timing diagram for various conventional burst read and write operations to SDRAM, for adapter 10 configured as illustrated in FIG. 5. As a result, signals at the device interface 12 and memory interface 14 are the same. Device clock (CLK_DEV) and memory clock (CLK_MEM) are synchronized. Reformat blocks 16, 18, 22 and address generator 20 simply pass device signals to interconnected memory without conversion. In the illustrated examples, the burst operations are performed after interconnected SDRAM module 38 has been previously configured for burst mode operation, four (4) word bursts, and a CAS latency of three clock cycles.

As illustrated, for a conventional burst write operation, an SDRAM column address is presented at the address lines of the SDRAM modules in the middle of the T0 clock cycle (signal 200). The column address signal line (CAS_DEV and CAS_MEM) is concurrently strobed (signal 212). Similarly, the write enable line (WE_DEV and WE_MEM) is strobed (signal 214). At the same time, a first burst of four data units A,B,C,D may be presented at data lines DQ_DEV and DQ_MEM (signal 204). Each data unit is presented for one half a clock cycle. Presentation of data is strobed at the interconnected memory using the DQS_MEM lines (signal 208)

thereby writing to the memory at the specified column address (this assumes that a row has already been opened in memory access instructions/signals not specifically illustrated).

A further burst may be written within the open row by presenting a new column address $C_{N+4}$, two clock cycles after the beginning of the first column address (i.e., in the middle of clock cycle $T_3$) at address lines ADR_DEV and ADR_MEM (signal 202). Again, the CAS_MEM (signal 216) may be strobed and write enable may be provided at WE_DEV and WE_MEM (signal 218). Again, data to be written may be presented on the data lines (DQ_MEM) one clock cycle later at $T_4$ (signal 206), accompanied by strobing of the DQS_MEM line (signal 210). As will be appreciated, presentation of column addresses every second clock cycle and strobing of CAS line allows contiguous writing of bursts of data in accordance with conventional SDRAM access techniques.

Optionally, other rows in other banks of an interconnected SDRAM may be opened while data is being written to a particular bank, as is conventional with SDRAM addressing. This is illustrated in FIG. 7 in clock cycle $T_1$ during which a new row address $R_w$ for a bank that is not currently accessed is presented (signal 220), accompanied by a row access strobe (RAS_MEM—signal 232) thereby opening the row $R_w$.

At a later time (e.g., during clock cycle $T_6$), further column addresses (signal 224) in the opened row of $R_w$ may be presented at the address lines accompanied with a CAS strobe (signal 226). Data is read from the location specified by this column address and row $R_w$ after the CAS latency, as presented at data lines DQ_MEM (signal 228). Interconnected SDRAM memory strobes DQS_MEM lines as illustrated during clock cycle $T_{10}$ (signal 230) and onwards.

Transmit/receive blocks 32 and 34 are toggled to assume their read state by gate generator of block 24. That is, generator of block 24 generates READ_MEM and READ_DEV strobes after a delay specified by the CAS latency stored in CAS_LATENCY store of block 24, upon detection of a read command (WE=LOW+CAS=HI).

Now, adapter 10 operating in its second configuration, converts SDRAM data and command signals received at its device interface 12 to appropriate signals at its memory interface 14 to allow access to one or more SDRAM modules, in data units having a bit size that is a fraction (one $n^{th}$) of the data unit size expected by the device accessing the SDRAM memory, but at a higher rate.

Figure 8:
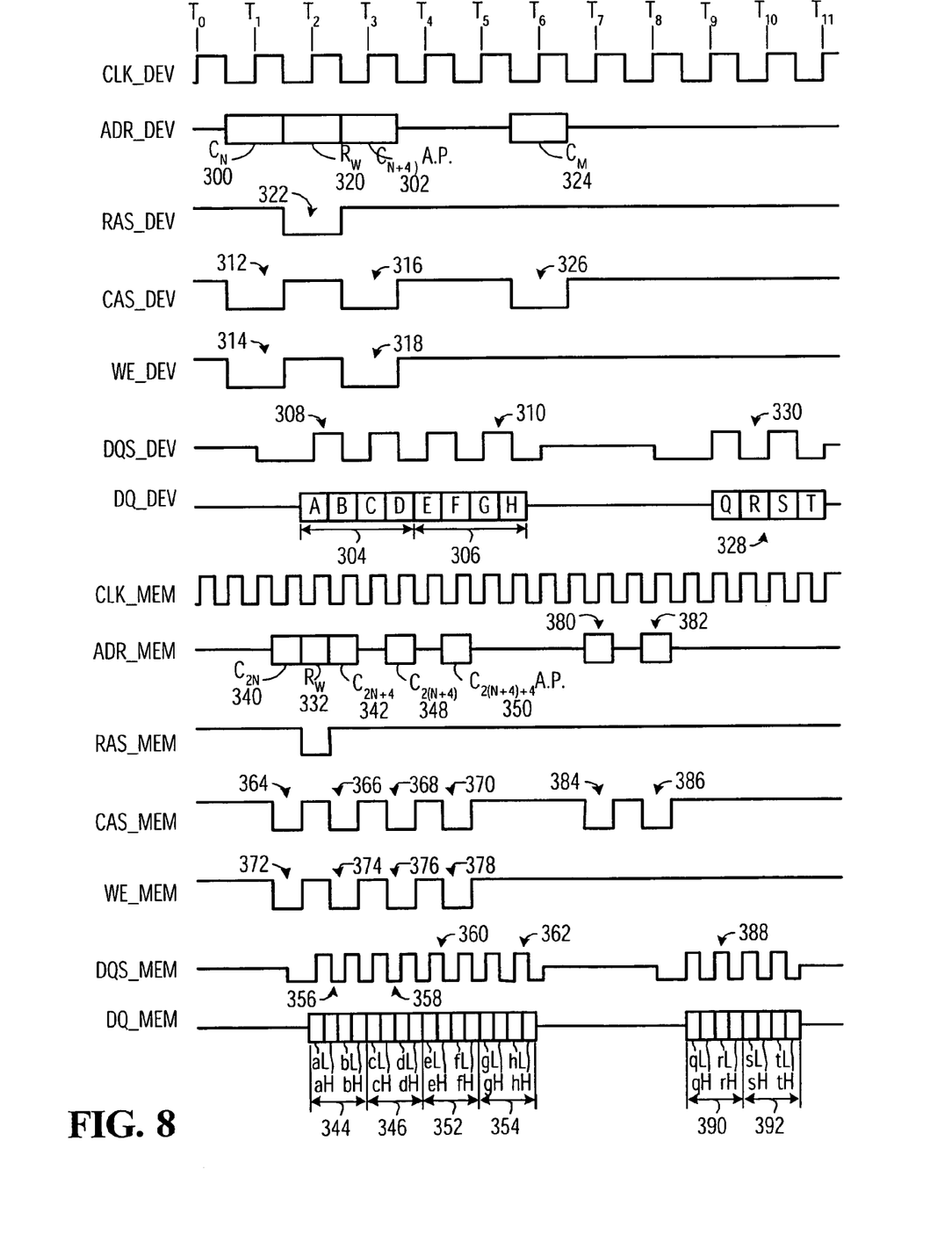
FIG. 8 is a timing diagram of the memory adapter of FIG. 1 in the configuration of FIG. 6, in operation.

For purposes of illustration, FIG. 8 illustrates the translation of SDRAM access commands illustrated in FIG. 7 at the device interface 12 of adapter 10. Data having half the width of data at the input data lines DQ_DEV is presented or received at eight of the data lines DQ_MEM. Adapter 10, operating in this mode has an internal clock CLK_MEM operating at twice the rate of the accessing device clock CLK_DEV thereby effectively causing data to be transferred from interconnected memory at n time (i.e. twice) the rate and one $n^{th}$ (i.e. half the data unit size. That is, in the depicted embodiment, sixteen bit data units are transferred from and to interconnected memory at DQ_MEM, at twice the clock rate (CLK_MEM) as in the configuration of FIG. 5. At DQ_DEV thirty two bit data units are passed at the conventional clock rate of the device (CLK_DEV). CLK_MEM may be derived from CLK_DEV at phase lock loop of clocking block 26. The net memory bandwidth (i.e. bits/second) is the same for configurations of FIGS. 5 and 6.

As illustrated, in response to receiving a column address $C_N$ at ADR_DEV (signal 300) and accompanying column address strobe CAS_DEV (signal 312), two column addresses $C_{2N}$ and $C_{2N+BURST}$ ($=C_{2N+4}$) are generated by address generator 20, at output ADR_MEM (signals 340 and 342).

As illustrated in FIG. 4, address generator 20 includes a selector 50. Feeding selector 50 is multiplier 70 multiplying the received column address at ADR_DEV by two, and adder 52 that provides the received column address multiplied by multiplier 70 increased by the burst size (four), and stored in memory element 54. The state of selector 50 is controlled by the CAS_DETECT signal delayed by a device clock cycle by memory element 60, and ANDed with the low cycle of the device clock (CLD_DEV). In this way, selector 50 sequentially provides the column address multiplied by two C2N, and the column address multiplied by two incremented by the burst size C2N+4. Column addresses are only provided on even clock memory clock cycles as controlled by selector 68.

As data units within memory have half the bit size of data words at device interface 12, the addresses used at interconnected memory are twice the size of the address at the device. Generated memory column addresses $C_{2N}$ and $C_{2N+4}$ are two memory clock cycles apart (i.e. spaced by a single memory clock cycle—in this case at the interface rate CLK_MEM) and are generated by address generator 20 one half a clock cycle after receipt of the command giving rise to their generation (signal 300). Associated CAS_MEM line is strobed (signal 364, 366) by address generator 20.

A burst of data at input data lines DQ_MEM (data units A,B,C,D—signals 304) is written to memory by reformat block 16 as two sequential and contiguous bursts of data (signal 344, 346) at DQ_MEM (data units $a_L$, $a_H$, $b_L$, $b_H$ and $c_L$, $c_H$, $d_L$, $d_H$). Data at DQ_MEM is accompanied by data strobe signals 356 and 358 generated by reformat block 18 of adapter 10. Reformat block 18 converts the four device data strobes at DQS_DEV to two memory data strobes at DQS_MEM. Similarly, in response to receiving a column address $C_{N+4}$ (signal 302) at ADR_DEV, two column addresses $C_{2(n+4)}$ and $C_{2(n+4)+BURST}=C_{2(n+4)+4}$ (signals 348, 350) are generated by address generator 20 at ADR_MEM on odd interface clock cycles. As memory access is a write access (as indicated by write enable signals 314, 318 at WE_DEV), corresponding write enable signals (signals 372, 374, 376, 378) are generate at memory write lines (WE_MEM). Again, the $C_{2(n+4)}$ and $C_{2(n+4)+BURST}$ signals are accompanied by CAS_MEM strobes (signals 368 and 370). Corresponding data at DQ_DEV (data units E,F,G,H—signals 306) is presented at DQ_MEM lines (as data units $e_L$, $e_H$, $f_L$, $f_H$ and $g_L$, $g_H$, $h_L$, $h_H$) beginning with the even odd clock cycle immediately following the $C_{2(n+4)}$ address (signals 352 and 354).

Notably, each burst memory write access is translated into two burst accesses of the memory device by address generator 20. Conveniently, the two memory accesses are spaced by one memory clock cycle. This allows writing of the two bursts contiguously. Timing to address generator 20 (CAS_DETECT) and transmit/receive blocks 32 and 34 (READ_DEV, READ_MEM) is provided by block 24. That is, a burst access at device interface 12 at address $C_N$, providing data units A,B,C,D is translated into two burst accesses at memory interface 14 at addresses $C_{2N}$, $C_{2N+4}$ providing data units $a_L,a_H,b_L,b_H$ and $c_L,c_H,d_L,d_H$ respectively (with $A=a_L a_H$, $B=b_L b_H$, $C=c_L c_H$, $D=d_L d_H$). Similarly, a burst access of four data units at address $C_{N+4}$ at device interface 12 is translated into two sequential burst accesses of four half sized data units at memory interface 14 at addresses $C_{2(N+4)}$, $C_{2(N+4)+4}$.

Optionally, address generator 20 further translates a burst access at a column address with auto-precharge (used in SDRAM to close a currently accessed row or page) to two burst accesses, of which only the last (i.e. second) is an auto-precharge access. Typically, an auto-precharge is identified by a set bit in the provided address. For the example address generator 20, gates 56 and 64 monitor bit ten (10) of the provided address to identify an auto-precharge. In this way, the row pre-charge at the memory is not generated prematurely, and is masked for the first of two generated addresses, resulting from a column address with auto-precharge. Gate 64 ensures that bit ten is not masked by gate 56 for row addresses, and not for row addresses. This is illustrated in FIG. 8 for column address $C_{N+4}$ (AP) (signal 302) resulting in translated $C_{2(N+4)}$ and $C_{2(N+4)+4}$ (AP) addresses (signal 348 and 350).

Likewise, burst read access at column address $C_M$ is translated to two sequential read accesses by address generator 20. Notably, column address $C_M$ presented at address lines ADR_DEV (signal 324) and accompanying column address strobe at CAS_DEV (signal 326) in clock cycle $T_6$ are translated to column address $C_{2M}$ and $C_{2M+4}$ presented at ADR_MEM (signals 380, 382), accompanied by column address strobes generated at CAS_MEM (signals 384 and 386) by address generator 20. Interconnected memory responds by providing two sequential bursts $q_L q_H r_L r_H$ and $s_L s_H t_L t_H$ of data (signals 390, 392), beginning a number of clock cycles specified by the CAS latency of the memory.

Figure 3:
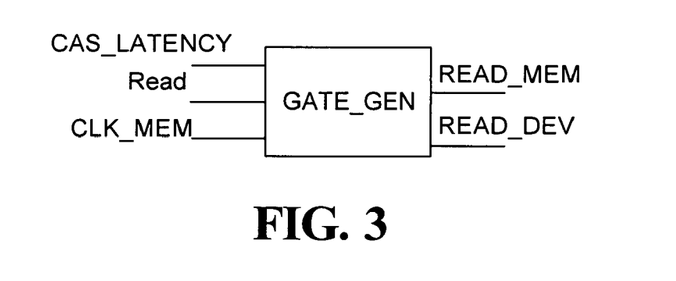

Gate generator of block 24 (illustrated in FIG. 3) provides a strobe signal READ_MEM to transmitter/receiver block 32 causing block 32 to receive the arriving data after the CAS latency of memory. Block 32 generates the READ_MEM signal after receipt of a read signal from the decoder block of block 24. The delay, in memory clock cycles, is controlled by the decoded value stored in the CAS_LATENCY store of block 24. As the transmit/receive block of an interconnected device at interface 12 may not yet be in a state to receive data from the interconnected memory, block 32 ensures that data provided by interconnected RAM will be received, and provided to reformat block 22. A complementary signal is provided to transmitter/block 34 in communication with device interface 12.

Data read on lines DQ_MEM is passed to reformat block 22 and to lines DQ_DEV. Reformat block 22 assembles the data from the two bursts from memory into a single burst of data units each having the word size expected by the device, with $Q=q_L q_H$, $R=r_L r_H$, $S=s_L s_H$, $T=t_L t_H$. The reassembled single burst is presented at device data lines DQ_DEV (signal 328). Conveniently, the two bursts are received by transmit/receive block 30 after the CAS latency of the interconnected SDRAM memory, and immediately passed to reformat block 22. The assembled single burst is presented at data lines DQ_DEV after the CAS latency expected by the interconnected device.

Optionally, as in FIG. 7, other rows in other banks of an interconnected SDRAM may be opened while data is being written to a particular bank, as is conventional with SDRAM addressing. This is illustrated in FIG. 8 in clock cycle $T_1$ during which a new row address $R_w$ for a bank that is not currently accessed is presented by an interconnected device at ADR_DEV (signal 320) accompanied by a row access strobe (RAS_DEV—signal 322). This row address is passed to interconnected SDRAM by way of address generator 20. However, address generator 20 generates the row address $R_W$ at address lines of interconnected memory, ADR_MEM, (signal 332) in the second half of $T_1$, on an odd clock cycle of the memory clock (i.e. an odd cycle of CLK_MEM). In this way, the $R_W$ signal may be generated at ADR_MEM (signal 332) between two generated column addresses (in this case between column address $C_2N$ (signal 340) and $C_{2N+4}$ (signal 342)). The generated $R_W$ is accompanied by a generated RAS strobe at RAS_MEM. This is accomplished at address generator 20 by selector 68 (FIG. 4) providing unmodified addresses at ADR_DEV. Gates 72 and 74 control multiplexer 68 to ensure that the row address is passed through by address generator 20, on odd cycles of the memory clock (CLK_MEM) (i.e. on CLK_DEV=high) or in the absence of a CAS_DETECT signal, between two generated column addresses, within the second half of a memory clock cycle. Memory element 66 stores the row address to be presented to interconnected memory by way of ADR_MEM on transitions of CLK_MEM, between two generated column addresses.

Conveniently, by generating row address signal $R_W$ and accompanying row address strobe (RAS_MEM) at ADR_MEM in odd memory clock cycles, while generating the CAS signals (CAS_MEM) in even clock cycles, adapter 10 is able to generate row addresses between column addresses, without impeding the performance of adapter 10. Gates 62 and 64 taking CLK_DEV as inputs ensure that column address signals are only generated on a low CLK_DEV (i.e. an odd cycle of CLK_MEM), while row address signals are only generated on a hi CLK_DEV (i.e. an even cycle of CLK_MEM).

Other conventional SDRAM commands involving the RAS_DEV signal are not synchronized or otherwise modified by adapter 10 and are kept in alignment with the state of the CAS_DEV and WE_DEV signals, and corresponding CAS_MEM and WE_MEM signals.

Operation of adapter 10 to translate commands and data from device to memory, and from memory to the device in its second configuration may be summarized with reference to tables 1, 2 and 3.

TABLE 1

TRANSLATION OF ADDRESSES FOR
READ AND WRITE OPERATIONS

| DEVICE I/F | MEMORY I/F | TIMING |
|---|---|---|
| Column address $C_N$ | $C_{2N}$ and $C_{2N+BURST}$ two memory clock cycles later | next odd memory clock cycle |
| Column address with auto-precharge address $C_N$ | $C_{2N}$ without precharge $C_{2N+BURST}$ with auto-precharge two memory clock cycles later | next odd memory clock cycle |
| Row address $R_W$ | Row address $R_W$ | next even memory clock cycle |

TABLE 2

TRANSLATION OF DATA FROM DEVICE
TO MEMORY FOR WRITE OPERATIONS

| DEVICE I/F | MEMORY I/F | TIMING |
|---|---|---|
| Burst A, B, C, D on DQ_DEV | Burst 1 $a_L, a_H, b_L, b_H$ on DQ_MEM | memory clock cycle after column address (e.g. $C_{2N}$) |
| | Burst 2 $c_L, c_H, d_L, d_H$ on DQ_MEM | immediately after burst 1 |

TABLE 3

TRANSLATION OF DATA FROM MEMORY TO DEVICE FOR WRITE OPERATIONS

| MEMORY I/F | DEVICE I/F | TIMING |
|---|---|---|
| burst $q_L$, $q_H$, $r_L$, $r_H$ on DQ_MEM* | one half burst including Q, R on DQ_DEV | at memory interface CAS latency after receipt of burst column address (e.g. $C_{2M}$). at device interface, immediately after receipt of low and high data units from SDRAM memory |

*PERFORMED IN MULTIPLE BURSTS AS A RESULT OF TRANSLATION OF $C_N$ TO $C_{2N}$ AND $C_{2N+BURST}$ COLUMN ADDRESSES

A person of ordinary skill will now appreciate that adapter 10 could easily be modified to translate data and commands at interface 12 operate to read/write to SDRAM at various integer multiples of the interface clock rates. Write data may be converted from one bit size to one nth the bit size for writing to SDRMA modules. Read data could similarly be converted from the read bit size to n times this bit size. Instead of issuing two column addresses for each burst access commands at memory interface 14 at device interface 12, adapter 10 could be modified to issue n burst access commands, each spaced by a clock cycle.

Translation to multiple burst access commands may be used to increase overall memory throughput, or may be accompanied by a reduction of the data unit size to SDRAM to allow memory access at a uniform expected rate. That is, for each column address provided by a device, a burst of data having the same burst size as is expected by the device can be accessed, with each data burst from and to the SDRAM having one nth the size is presented at lines DQ_MEM.

Memory clock rate could be similarly adjusted relative to the device clock to provide data at the rate expected by the interconnected device.

Moreover, as will be appreciated, adapter 10 has been depicted as a separate component for interconnection between a memory accessing device and SDRAM. Adapter 10 could readily be formed as part of a memory accessing component, such as a CPU, GPU, DMA controller, a video processing unit, or the like or the like. So formed, device interface 12 and mode select input 28 may be entirely hidden, or need not be directly compatible with a conventional SDRAM interconnect.

As well, although adapter 10 has been described as interconnected with conventional SDRAM, adapter 10 could similarly function with dual data rate (DDR) SDRAM.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A synchronous dynamic random access memory (SDRAM) module coupled to a memory accessing device by way of a memory adapter, said memory adapter comprising a device interface for communicating with said memory accessing device providing a first clock at a first clock rate, said device interface being operable to receive an SDRAM command, a row address and a column address for a data read or write of a burst of data units, and a data unit to be written to said SDRAM module having an expected bit size, wherein said SDRAM module comprises:

a memory interface for interconnection with said memory adapter, said memory interface comprising:
 a memory clock line for receiving from said memory adapter a memory clock at a frequency equal to n times said first clock, and phase-locked with said first clock, wherein n>1;
 a plurality of control lines for receiving from said memory adapter n SDRAM commands generated from said received SDRAM command;
 an address line for receiving from said memory adapter n column addresses generated from said received column address and said row address, said row address presented on said address line between two adjacent ones of said n column addresses; and
 a plurality of data lines for receiving from said memory adapter n data units generated from said received data unit, each of said n data units having one nth said expected bit size.

2. The SDRAM module of claim 1, wherein said received a column address at said device interface is for a write operation, and said received column address includes an auto-precharge instruction, and wherein the nth one of said generated n column addresses includes an auto-precharge instruction.

3. The SDRAM module of claim 1, wherein said n column memory addresses are received on said address line at intervals of two clock cycles of said SDRAM.

4. The SDRAM module of claim 1, wherein said row address is received between two column addresses at said device interface.

5. The SDRAM module of claim 4, wherein said row address identifies a row in a bank of said SDRAM module different from a bank of said SDRAM module accessed by said n column memory addresses.

6. A synchronous dynamic random access memory (SDRAM) module coupled to a memory accessing device by way of a memory adapter, said memory adapter comprising:
a device interface for communicating with said memory accessing device, said memory accessing device providing a device clock at a device clock rate, a mode selector input, to select one of a first and second mode of operation of said memory adapter, said device interface being operable to receive an SDRAM command, a row address and a column address for a data read or write of a burst of data units, wherein said SDRAM module comprises:
 a memory interface for interconnection with said memory adapter, said memory interface comprising:
  a memory clock line for receiving from said memory adapter, in said first mode, a memory clock at a frequency equal to said device clock rate and phase locked to said device clock, and in said second mode, a memory clock at a frequency equal to n times said device clock rate and phase locked to said device clock, wherein n>1;
  a plurality of control lines for receiving from said memory adapter, in said first mode, said received SDRAM command, and in said second mode, n SDRAM commands generated from said received SDRAM command;
  an address line for receiving from said memory adapter, in said first mode, said received column address and said received row address, and in said second mode, n column addresses generated from said received column address and said received row address, said row address presented on said address line between two adjacent ones of said n column addresses.

7. The SDRAM module of claim 6, wherein said device interface is further operable to receive a data unit to be written to said SDRAM module having an expected bit size, and wherein said SDRAM module further comprises a plurality of data lines for receiving from said memory adapter, in said first mode, said received data unit, and in said second mode, n data units generated from said received data unit, each of said n data units having one $n^{th}$ said expected bit size.

8. The SDRAM module of claim 7, wherein said n column memory addresses are received on said address line at intervals of two clock cycles of said SDRAM.

9. The SDRAM module of claim 6, wherein said received a column address at said device interface is for a write operation, and said received column address includes an auto-precharge instruction, and wherein the nth one of said generated n column addresses includes an auto-precharge instruction.

10. The SDRAM module of claim 6, wherein said row address is received between two column addresses at said device interface.

11. The SDRAM module of claim 10, wherein said row address identifies a row in a bank of said SDRAM module different from a bank of said SDRAM module accessed by said n column memory addresses.

* * * * *